United States Patent [19]
Gildea et al.

[11] Patent Number: 6,109,615
[45] Date of Patent: Aug. 29, 2000

[54] PLENUM OIL SEAL

[75] Inventors: Greg G. Gildea, Crystal Lake; Joseph D. Galvin, Lombard; Brian Davis, Lisle, all of Ill.

[73] Assignee: SKF USA Inc., Elgin, Ill.

[21] Appl. No.: 09/092,677

[22] Filed: Jun. 5, 1998

[51] Int. Cl.[7] ..................................... F16J 15/32
[52] U.S. Cl. .................... 277/349; 277/353; 277/628
[58] Field of Search .................... 277/353, 549, 277/572, 573, 576, 577, 628, 349

[56] References Cited

U.S. PATENT DOCUMENTS

| | | |
|---|---|---|
| 2,586,297 | 2/1952 | Brummer . |
| 4,325,557 | 4/1982 | Kawamoto . |
| 4,425,838 | 1/1984 | Pippert . |
| 4,869,516 | 9/1989 | Udagawa et al. . |
| 4,986,552 | 1/1991 | Anzue et al. ...................... 277/349 X |
| 5,354,073 | 10/1994 | Ecker et al. ...................... 277/628 X |
| 5,713,579 | 2/1998 | Petrak et al. ...................... 277/353 |
| 5,813,830 | 9/1998 | Smith et al. ...................... 277/349 X |
| 5,887,875 | 3/1999 | Salciccioli et al. ............. 277/549 X |

*Primary Examiner*—Anthony Knight
*Assistant Examiner*—Karlena D. Schwing
*Attorney, Agent, or Firm*—James T. FitzGibbon; Vedder, Price, Kaufman & Kammholz

[57] ABSTRACT

An oil seal for a locking differential mechanism. The seal assembly includes a generally flat plate with a first generally circular oil seal adjacent an outer margin of the flat plate, a circular inner margin defining an opening in the flat plate with a second oil seal surrounding the inner margin, an oil outlet opening lying in an otherwise imperforate area between the first and second margins, and a cover for the flat plate with the cover and plate defining between them a passage for oil extending from a point radially outside the first seal to at least a point adjacent the oil outlet. The seal takes in a supply of oil from the differential sump and supplies it through the oil outlet to a multi-plate clutch which is activated only when the two axles undergo rotation relative to each other and thereby actuate a Gerotor type oil pump.

19 Claims, 4 Drawing Sheets

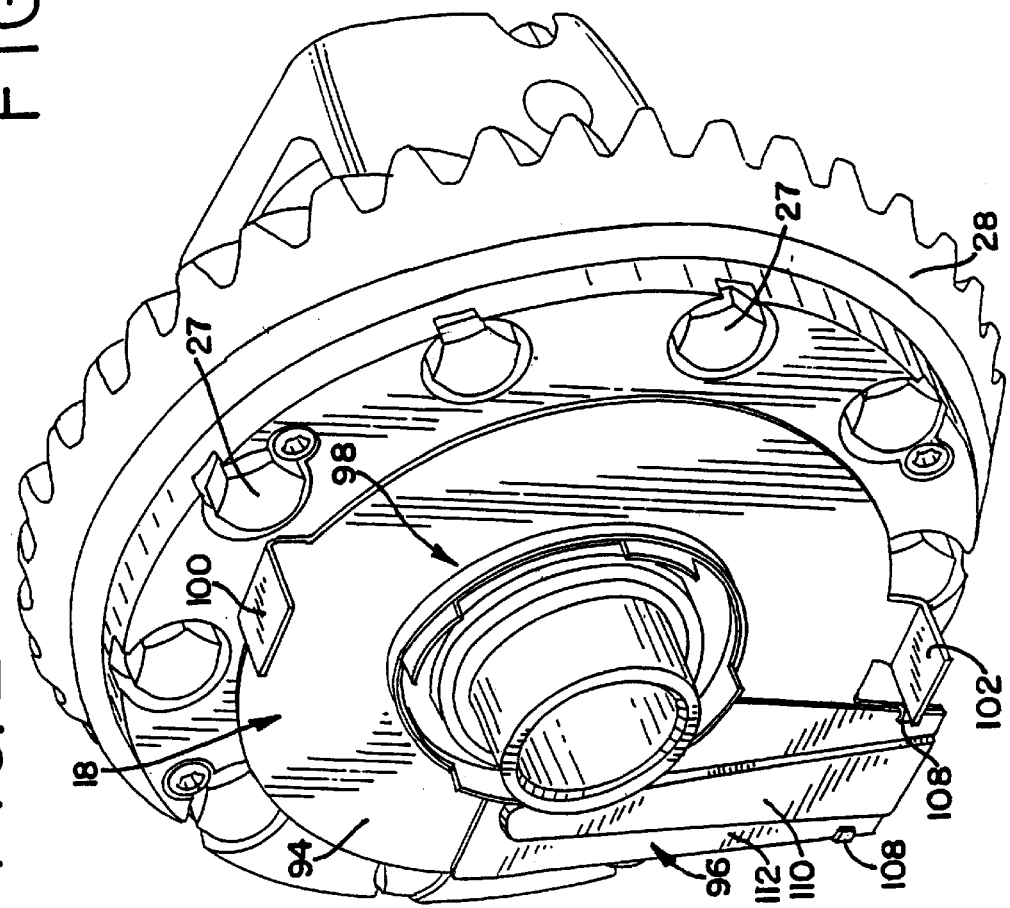
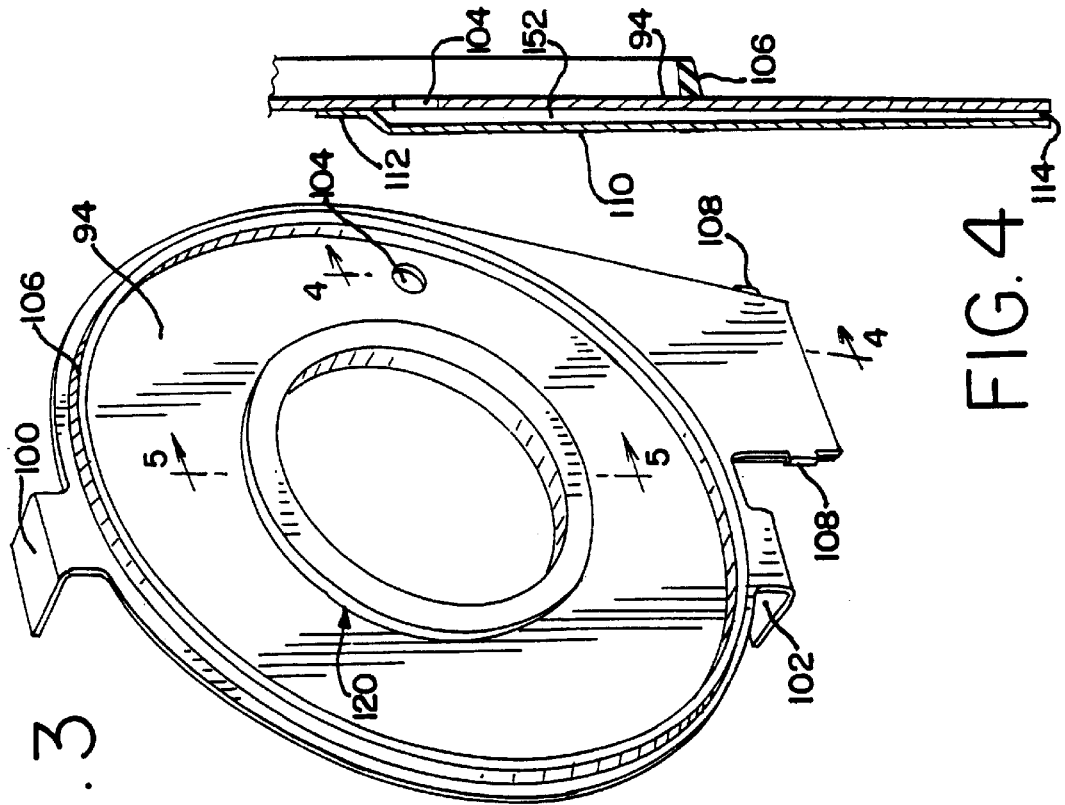

PLENUM OIL SEAL

BACKGROUND OF THE INVENTION

The present invention relates generally to oil seals and more particularly, to a combination seal and oil directing device.

Still further, the invention relates to a device that enables oil, including relatively heavy oil, to be picked up from a sump and delivered to a pump which operates only intermittently, and serves to supply pressure to an annular piston. The piston, in turn, when energized, acts through a multi-plate clutch and tends to lock the spider gears of a differential against relative rotation and thus lock the drive axles of a vehicle together. When there is little or no relative motion between the axles, the pump ceases to function transiently and the axles are unlocked. The seal also functions to deliver oil sufficient to permit somewhat limited slippage of the two axles.

The invention preferably includes a large stamping, a small circular stamping, and a third auxiliary stamping that serves, in cooperation with the main stamping, to form a dip tube to deliver the oil from the sump to the oil pump, where it performs to above-described functions. In a preferred form, the main stamping includes one or more tabs to prevent rotation relative to the ring gear with which it is associated in use. Normally, the ring gear rotates and the seal directing device does not. Herein, although the plenum seal of the invention has the oil directing and other functions, it is sometimes referred to herein for convenience merely as a "seal".

According to the invention, a preferred form of the device includes a part facing the intake of the oil pump, with a seal band extending around the exterior thereof, and an opening of a smaller diameter nearer the center thereof, which also features a seal extending in the opposite direction. On the side opposite the oil outlet, are preferably several tabs that serve to locate the seal in its environment.

One of the components of the seal includes a cover element preferably having associated therewith a cover with an offset area serving to define, in combination with the main body unit, an oil passage. This cover is held to the main body unit by a series of tabs and preferably, also by adhesive surrounding the formation but leaving the oil inlet free. The differential housing includes a sump, and hence the oil seal has an opening at the bottom, an area of thin, and preferably enlarging, dimension leading to the oil outlet opening in the seal, and terminating at the opening.

The differential housing contains a pinion or driving gear, which serve to rotate a ring gear and its associated components, at a reduced speed relative to the pinion gear.

Referring again to the side with the opening, this side faces the opening in the ring gear for the inlet of an oil pump. The pump consists of two gears or rotors which rotate at different speeds relative to each other within a housing. Preferably, the pieces are of a "Gerotor" design that takes oil in through openings inside a cover plate that lies partially within the ring gear and forces oil out in the opposite axial direction against a bonded piston to actuate a multi-plate clutch.

The gear pump includes an exterior housing, an internal rotor and an external rotor. The internal rotor includes teeth on its inner diameter for engaging one axle and has outwardly directed formations thereon, and the external gear has internal formations thereon. These two, collectively, form an oil pump which has an inlet on one axial side and an outlet on the opposite axial side, with the inlet and outlet being spaced apart by about half a diameter. The oil is then pumped into a cavity in a housing containing a bonded piston. Upon sensing oil pressure, the piston moves so as to compress the discs of a multi-plate clutch and ultimately causes the drive axles to rotate together.

One drive axle extends through an opening in the ring gear, and this drive axle is splined so as to fit into the internal gear of the Gerotor, the driven clutch plates, and one of the side gears of the spider set. The second axle is internally splined to the other side gear. When the oil acts on the bonded piston, it tends to lock the internal splines on the first shaft to the second shaft, by locking out the spider carrier, thus causing both shafts to rotate as a unit, and doing away with differential action. When the bonded piston sees less oil pressure, it releases its grip, allowing the clutch plates to release to a greater or less degree, and the differential is then free to provide more or less differential action.

Accordingly, it is an object of the present invention to provide a plenum seal having certain advantages and characteristics.

Another object of the invention is to provide a plenum seal that seals on two diameters, that includes an oil passage therethrough, extending from outside both diameters to a point intermediate the two diameters.

Yet another object of the invention is to provide an oil seal that is made from inexpensive, preferably, stamped parts.

Still another object of the invention is to provide a seal having three components, one of which comprises a cover for a part of the other.

A further object of the invention is to provide a plenum seal having a flat plate with an O.D. seal, an opening in the flat plate, a stamping with an I.D. seal, and a cover, preferably of a contoured design, that fits over the flat plate to provide an oil supply line or area to a given part of an associated pump mechanism.

A still further object is to provide an oil seal that includes tabs for preventing rotation and thus insuring that the seal will remain in place relative to a rotating ring gear assembly.

Another object of the invention is to provide an oil seal of a design which may be generally followed in practice in a number of different sizes and which will serve to fulfill the requirements for an effective oil seal for a locking differential.

Yet another object of the invention is to provide an oil seal that includes a spring loaded lip on the inside sealing surface, and a non-spring loaded lip on the outside sealing surface, with the two lips facing in opposite axial directions.

Another object of the invention is to provide an oil seal assembly having oppositely directed seals, an oil delivery tube, and an oil outlet, with the delivery tube lying on the side opposite the outer diameter seal.

A further object of the invention is to provide a seal assembly with an oil pickup on one side of an outer diameter seal and an oil discharge opening on the other side.

A still further object of the invention is to provide a seal assembly that can maintain a volume of oil in the space between two seals for supplying the needs of an oil pump from time to time.

The invention achieves its objects, and other inherent objects and advantages by providing a plenum seal for a differential ring gear assembly, said seal including a portion sealing on an inside diameter of a part associated in use with the ring gear, such as an oil pump housing, and a portion sealing on an enlarged diameter of such part to create a sealed region between them, an oil outlet in the inter-seal area, and an oil inlet lying outside the sealed area, whereby oil may be picked up and pumped from a sump into a specially constructed differential, wherein it will serve, under proper conditions, to lock the drive axles together and enable a substantial torque to be applied to both axles.

The manner in which the foregoing and other objects are achieved in practice will become more clearly apparent when reference is made to the following detailed description of the present invention and to the accompanying drawings, in which like numbers indicate corresponding parts throughout.

BRIEF DESCRIPTION OF THE DRAWINGS

FIG. 2 is a perspective view of one end of the ring gear, with the axles not being shown for clarity, showing the seal in its position of use adjacent the oil pump housing and illustrating the locating tabs before they are clinched over the bearing caps with which they will be associated in use;

FIG. 3 is a perspective view of the other side of the ring gear plenum seal assembly of the invention, showing the outer diameter seal and oil outlet passage between the outer and inner seals;

FIG. 4 is an almost vertical sectional view, taken along lines 4—4 of FIG. 3, and showing the cover assembly cooperating with the main body plate to form an oil passage;

DESCRIPTION OF THE PREFERRED EMBODIMENTS OF THE INVENTION

The seal of the present invention has a primary use, and that is with a locking differential, particularly of the type described. However, with or without modifications, it may provide other uses wherein its features are advantageous, namely, filling and maintaining a reservoir of oil between inner and outer diameter seals, and between a sealed part and the two elastomeric seals of the device of the invention.

Figure 1:
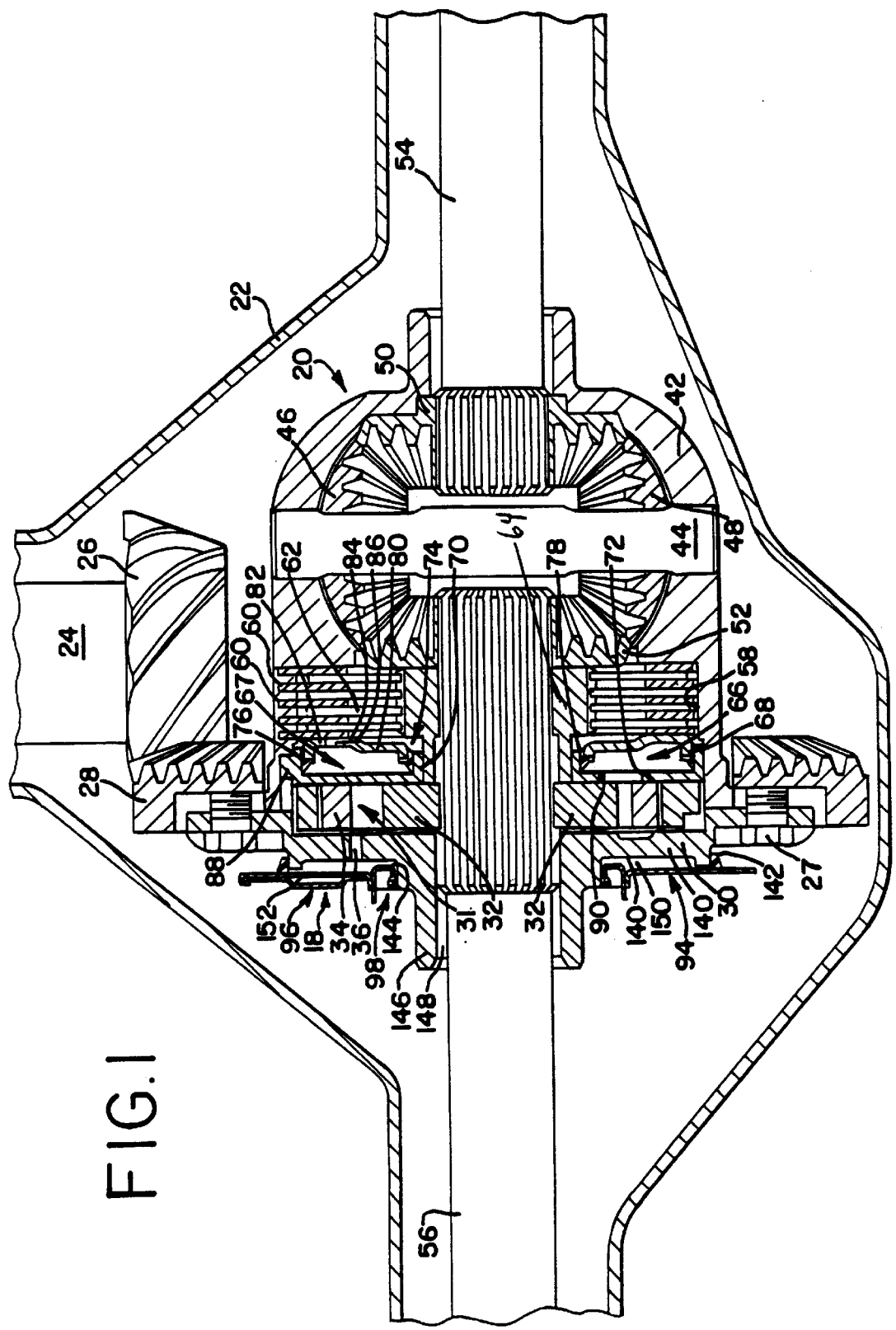
FIG. 1 is a horizontal sectional view, showing the seal of the invention associated with a differential containing a ring gear assembly, and numerous other components to be described in detail, including a pair of opposed drive axles.

Referring now to the drawings in greater detail, FIG. 1 shows the inventive unit to be embodied in a form of plenum seal generally designated 18, shown to be associated in use with a differential mechanism generally designated 20, and contained within a housing 22 for the differential assembly 20. Here, a pinion shaft 24 drives a conventional pinion gear 26, which in turn engages and drives a ring gear 28.

Figure 7:
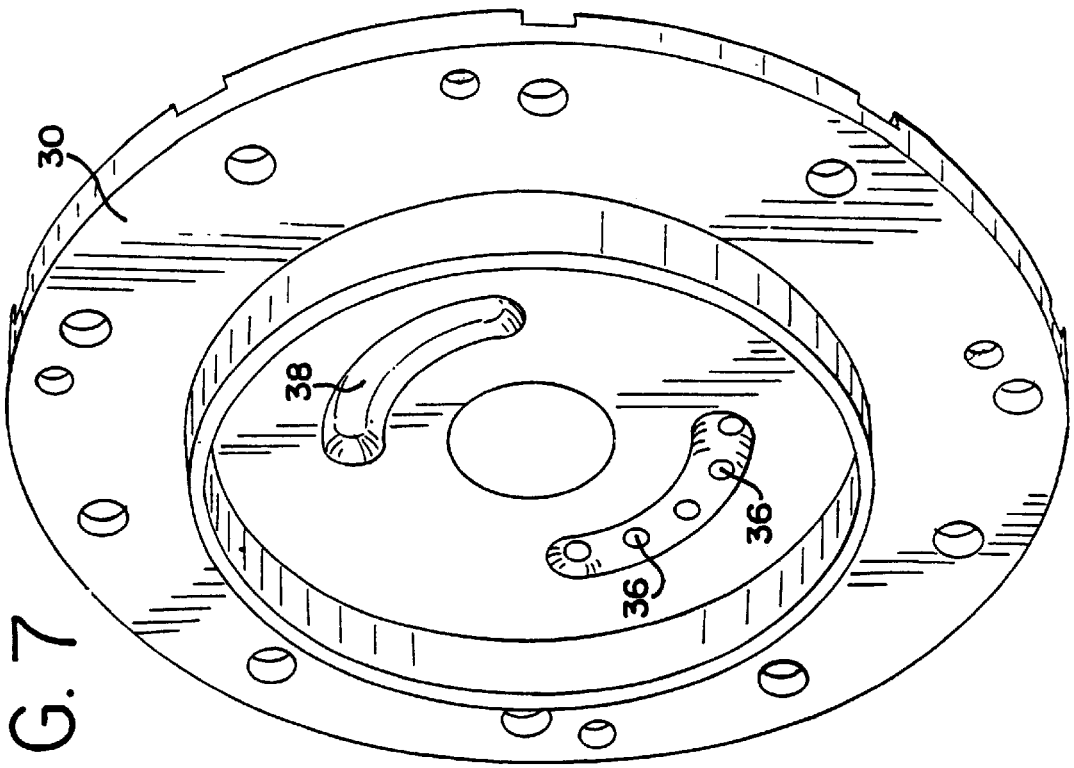
FIG. 7 is a view similar to FIG. 5, but showing the Gerotor-style pump taken out and showing the oil pump housing with both the inlet holes and the outlet formation for the oil pump associated with the invention.
Figure 6:
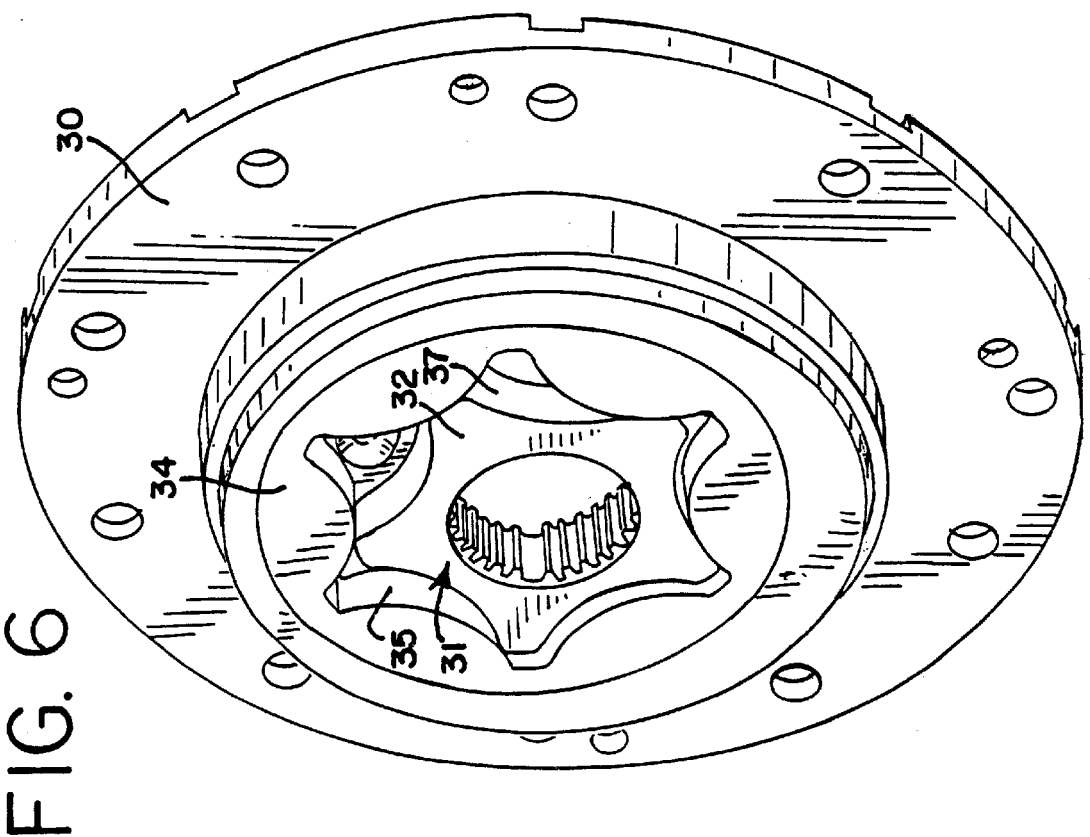
FIG. 6 is an assembled view of the oil pump housing, and the Gerotor-type oil pump, showing both rotary components thereof and a portion of the high pressure channel facing the outlet side.

Fasteners, such as cap screws 27 or the like, connect the ring gear 28 to a pump housing 30. A Gerotor-type oil pump 31 (FIG. 6) is an internal-external rotor type of a type known to those skilled in the art, and includes an interior rotor 32 and an exterior rotor 34. These rotors, as is known to those skilled in the art, operate by providing a gradually increasing space 35 between teeth wherein the oil is taken axially into the space between gears, transferred radially, and then expelled axially from the diminishing space 37 between the teeth as the rotors converge. The pump operates in conjunction with plural inlet passages 36 (FIG. 7) in the housing, and in connection with a recess 38 forming a part of an associated outlet to be referred to elsewhere herein.

Referring again to the differential ring gear 28 in FIG. 1, in addition to the pump housing 30, the ring gear also has affixed thereto a spider carrier 42. This spider carrier includes a spider gear shaft 44 carrying a pair of spider gears 46, 48 which in turn mesh with side gears 50, 52. Each of the side gears is splined to an axle 54, 56, with the pair of axles 54, 56 operating according to generally known principles, i.e., they will work together, or, in the case of an unbalanced load, the differential will allow one to spin and the other to stand still, to any degree necessary.

However, the present invention differs substantially from the prior art by being associated with a novel, modified differential assembly. In this new version, in addition to the novel plenum seal 18, and to the known spider carrier 42, spider gear shaft 44, spider gears 46, 48 and side gears 50, 52, the spider carrier 42 includes a large recess 58 which accommodates, among other things, a plurality of clutch driving plates 60 keyed to the carrier 42, and a plurality of clutch driven plates 62 splined to an internally toothed gear 64, which is then splined to one axle 56.

In addition, the spider carrier 42 contains, near its axially outermost end, (the left end as shown in FIG. 1) and inside the recess 58, a bonded piston assembly generally designated 66, which comprises a housing generally designated 67 including an outer cylindrical stub wall 68, an inner cylindrical stub wall 70, an apertured rear wall 72, and a bonded piston assembly generally designated 74. The piston assembly includes an oil seal at its outer diameter 76, an oil seal at its inner diameter 78, a radially inner face 80 and a radially outer face 82 which is slightly offset towards the clutch plates 60, 62. An oil bleed opening 84 is drilled in the piston 74 and the opening 84 includes a radial passage 86 therein, to allow an exact amount of oil to be bled therefrom.

The housing 67 for the bonded piston also contains a plurality of locating lugs 88. In addition, the rear wall 72 of the housing 67 contains a plurality of openings 90 for oil which, under proper conditions, passes from the oil pump 31 and pressurizes the bonded piston 74, urging it to the right as shown in FIG. 1.

Referring now to the first embodiment of the plenum-type oil seal 18 of the invention, this unit is shown in varying positions in FIGS. 2–5, as well as in the sectional view of FIG. 1. The plenum seal generally designated 18 is shown to be comprised of a main body plate generally designated 94, a plate cover generally designated 96, and a seal insert generally designated 98. The main body plate 94 includes tabs 100, 102 to prevent rotation of the plenum seal 18 about its own axis. Upon installation, the tabs 100, 102 fit over a bearing cap or other fixed part to prevent rotation of the seal 18. The main body plate 94 also includes an opening 104 for the outlet of oil, and a large diameter, axially inwardly extending oil seal 106 adjacent its outside diameter.

A plurality of tabs 108 are also formed on the main body plate 94 for holding the cover plate unit 96 in place over the plate 94. The cover unit generally designated 96 includes a raised central portion 110, and a margin 112 overlying the main body plate 94 in the remainder of the area. The cover 96 is preferably also adhesively fastened to the main body plate 94, and then clinched in place with the tabs 108.

An oil pickup opening 114, as shown in FIG. 4, is provided at the bottom of the plate 94 and cover 96 for the inlet of oil. The raised portion of the cover 110 has a gradually increasing depth (from bottom to top as shown in FIG. 4) as it extends from the inlet towards the outlet at the middle of the seal assembly 18, and also a somewhat diminishing front-to-rear dimension as it approaches the middle of the seal assembly 18. The cross-sectional area of the oil passage is thus, generally speaking, kept approximately constant from the bottom to the top of the oil passage.

Figure 5:
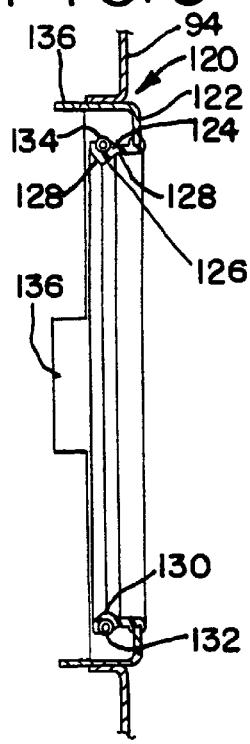
FIG. 5 is a sectional view, taken on lines 5—5 of FIG. 3 and showing the inner seal unit pressed into the main seal body.

Referring now to the seal insert 98, FIG. 5 shows that this unit is pressed into fluid-tight relation in an opening 120 formed in the main body plate 94. The assembly includes a relatively rigid stamping or other exterior casing 122, an elastomeric oil seal body 124, and "air" side and "oil" side surfaces 126, 128 meeting along a generally circumferential locus defining a seal band 130. "Air" and "oil" side surfaces are conventional in the seal art and refer to the surfaces facing the exterior space as well as the enclosed space, respectively. In the present case, however, it will be understood that oil exists on both sides of the seal. Under some conditions, a bath of oil is held between the seal and the housing 30, and in this sense, there is more oil in this area.

The elastomeric seal body 124 also includes an optional spring groove 132 in which a garter spring 134 is disposed for additional radial load. Additional tabs or ears 136 are also provided to allow oil to enter the area and lubricate the bearing and the seal. The tabs also provide a "stand off" function; that is, they serve as spacers for the installation.

Referring now to the operation of the inventive plenum seal 18, it will be assumed that the ring gear is in place with the oil pump housing thereover. The oil pump housing 30 houses the pump 31, and in addition, includes the rear surface 140, which has a rearwardly extending outer diameter cylindrical formation 142 and an inner diameter cylindrical formation 144 as well as a plate extension 146 which is spaced somewhat apart by an opening 148 from the axle 54. With the exception of the openings which form a part of the inlet passages 36, the rear plate 140 of the housing 30 is imperforate.

The plenum seal 18 fits generally over the plate 30, with the seal 106 snugly engaging the cylindrical formation 142 in fluid-tight relation. On the inner diameter, the elastomeric seal body 124 fits snugly over the cylindrical surface 144 so that the seal band 130 engages the cylindrical surface 144. As a result, there is an oil tight space 150 between the seal 18 and the rear surface 140 of the pump housing.

When the axle rotates relative to the ring gear, as permitted occasionally by the spider gears, the interior rotor 32 rotates with respect to the outer rotor 34. This creates a vacuum in the space 37 and draws oil up the vertical passage 152 from the bottom outlet 114, out the opening 104 in the main body plate, thus filling the space 150. From here, the oil travels through the opening 37, and ultimately out the space 38, through the openings 40 and into the space 66 behind the bonded piston 74.

Except for the small amount which leaks controllably out the opening 84 and through the passage 86, the system is fluid-tight. The oil pressure thus forces the plates 60, 62 together, ultimately rotating the spider carrier as a whole, and causing the gears 52, 50 to rotate together as a unit. As the elements continue to rotate, the oil pump operates and the clutch plates remain forced together.

When the force tending towards driving the gears at different speeds is lessened, then pump speed lessens and the hydraulic force is reduced. The axles are gradually freed to rotate at about the same speed. As long as the axles are rotating at almost (or exactly) the same speed, the pump will not operate. However, in this case, it will not be necessary in order to insure that the axles both rotate at the same speed.

It is only when the one axle begins to spin relative to the other that this action takes place. If the right-hand axle 54 rotates, relative to the left-hand axle 56, the result is still the same, as the pump 31 will be driven by the axle in any case. In this instance, the assembly will still lock up, and torque will then be transmitted equally to both axles.

Figure 8:
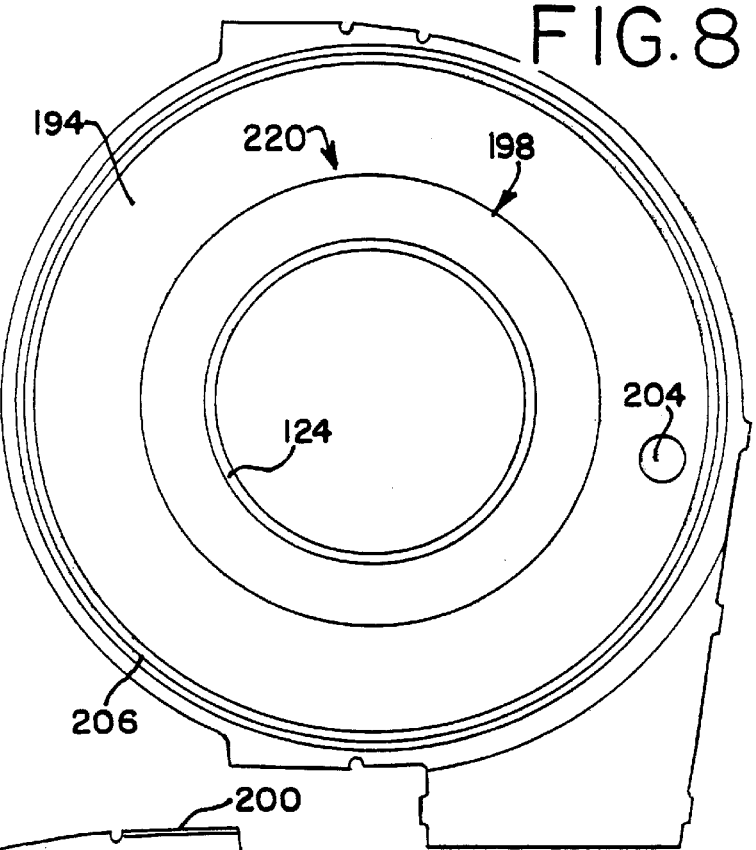
FIG. 8 is a side elevational view of another embodiment of the invention.
Figure 9:
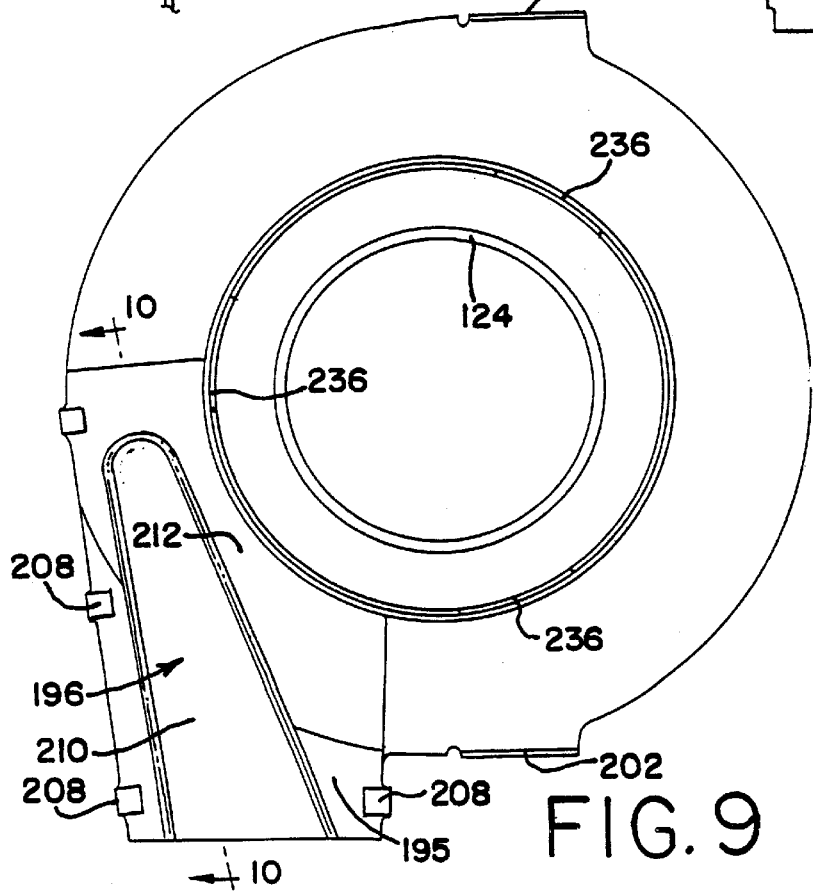
FIG. 9 is a view from the other side of the seal-of FIG. 8.
Figure 10:
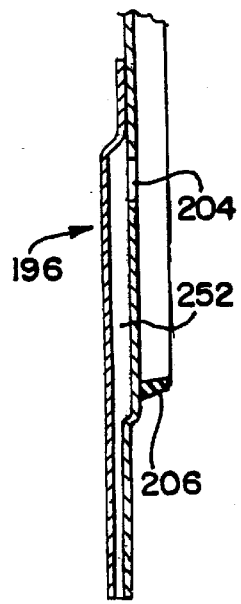
FIG. 10 is a sectional view of the seal of the invention, showing the taper between the seal body and the cover and showing the oil inlet and outlet in the plate and cover.

Referring now to FIGS. 8–10, a slightly different embodiment of the invention is shown. Here, a main body plate 194 is shown, having a insert 198 pressed into the opening 220. The oil hole or outlet 204 is the same, as are the outer diameter seal 206 and the inside diameter seal body 124. The tabs, 200, 202 are in a slightly different location as are the tabs 236. Nevertheless, these serve the same function as their counterparts in the above example.

Referring to the cover 196, this also includes the raised portion 210, and the tabs 208 securing it in place are the same. The depressed margin 212 is also the same or similar. However, the cross-section is somewhat different, with the cover assembly 196 having a contoured, raised portion 210. The plate 194 of the unit includes an offset portion 195 near the bottom, and the cover plate has a gradually increasing depth as it approaches the top, thereby keeping the cross-section of the space 252 generally constant. Other variations may be made to the form of seal shown in the drawings.

In the two forms of seal shown in the drawings, the intake for oil is shown as the space between the plate and the cover. Preferably, this places the oil intake just outside the diameter of the outer seal. If for some reason an oil pickup could be found in another location, i.e., with a substantial axial offset, the oil passage could be in the form of a tube or the like extending in fluid-tight relation from the oil outlet to a suitable place at which pickup would occur.

The plate 94 is shown as being flat or almost so, but there is no reason, other than economy, why it could not contain one or more offsets or indentations. The seal is shown with no garter spring on the outer diameter; however, this seal element could have a garter spring, just as the garter spring for the inside diameter could be omitted. Other variations will occur to those skilled in the art.

It will thus be seen that the present invention provides a combination seal and oil directing device, having a number of advantages and characteristics including those expressly pointed out here, and others which are inherent in the invention. Two illustrative embodiments of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. A plenum seal assembly, comprising, in combination, a generally flat plate assembly with radially inner and outer margins and including a first oil seal body adjacent said outer margin thereof, and a second oil seal assembly adjacent said inner margin thereof, an oil outlet opening in said plate lying between said inner and outer margins, said plate including a portion extending radially outwardly beyond said outer margin, and a cover for said plate, said cover extending generally from a locus radially outwardly of said outer diameter seal body to a point generally adjacent said oil outlet opening and cooperating with said plate to define an oil passage and an oil inlet opening, said cover being sealed in substantially fluid-tight relation to said flat plate except for said inlet and outlet openings, thereby providing an assembly for picking up oil from a sump lying outside said outer diameter margin and supplying said oil to a mechanism having an oil inlet lying radially between said seal bodies.

2. A plenum seal assembly as defined in claim 1, wherein said generally flat plate has at least one tab thereon for preventing rotation of said plenum seal assembly relative to a mechanism being sealed.

3. A plenum seal assembly as defined in claim 1, wherein said second oil seal assembly adjacent said inner margin comprises an inner marginal opening, and a seal casing extending through said opening in fluid-tight relation, said second oil seal assembly including an elastomeric body bonded to said casing.

4. A plenum seal assembly as defined in claim 3, wherein said casing of said second oil seal includes at least one tab therein for engaging an associated part.

5. A plenum seal assembly as defined in claim 1, wherein said first oil seal body extends in one axial direction and the second oil seal assembly includes a body extending in an opposite axial direction.

6. A plenum seal assembly as defined in claim 1, wherein said first oil seal body is a springless seal body.

7. A plenum seal assembly as defined in claim 1, said second oil seal assembly comprising a casing and an oil seal body bonded to an inside diameter portion of said casing, said oil seal body having air and oil side surfaces meeting along a generally circular locus to provide a seal band of intended contact with an associated part, said casing being press fit into said inner margin of said plate.

8. A plenum seal assembly as defined in claim 7, wherein said oil seal body of said second oil seal assembly includes a spring groove with a garter spring disposed therein to provide additional radial load.

9. A plenum seal assembly as defined in claim 1, wherein said cover is held adjacent said generally flat plate by a plurality of folded over tabs.

10. A plenum seal assembly as defined in claim 1, wherein said cover is held in place adjacent said flat plate by a plurality of tabs pressed thereover, and in addition, by a layer of adhesive extending around the entire outer margin of said cover, except for said oil inlet.

11. A plenum seal assembly, comprising, in combination, a plate having a main body portion and a first oil seal body extending around the entire periphery thereof and designed to seal on a first, enlarged diameter of an associated part, an opening in the center of said plate, an oil outlet opening between said first seal around said periphery and said opening in said center of said plate, a second oil seal assembly including a casing portion and an elastomeric seal body secured to said casing portion, said second oil seal assembly being pressed into said opening, said second seal body having air side and oil side surfaces meeting along a substantially circular locus to form a seal band intended to contact with a sealed part on a second, smaller diameter on said sealed part, and an oil passage extending from said oil outlet opening to a region outside said outer periphery of said seal, said sealed region between said first and second seals being imperforate from one side when installed, except for said oil outlet opening.

12. A plenum seal assembly as defined in claim 11, wherein said first oil seal body and said elastomeric seal body of said second oil seal assembly extend in axially opposite directions.

13. A plenum seal assembly as defined in claim 11, wherein said oil passage comprises a part of said plate and a cover for said plate.

14. A plenum seal assembly as defined in claim 13, wherein said cover is secured to said plate by a plurality of tabs.

15. A plenum seal assembly as defined in claim 14, wherein said assembly also includes an adhesive disposed between said cover and said plate.

16. A plenum seal assembly as defined in claim 11, wherein said plate includes at least one tab extending into contact with an associated machine part to prevent rotation of said seal assembly in use.

17. A plenum seal assembly as defined in claim 11, wherein said casing portion of said second oil seal includes tabs adapted to lie in a position adjacent another assembly to space said seal relative to said other assembly.

18. In combination, an oil seal assembly and a part rotatable with a ring gear on a differential mechanism, said rotatable part having a circular locus of a first, larger diameter and a second locus of a second, smaller diameter, both of said loci having generally circumferentially extending, substantially cylindrical surfaces, said oil seal assembly having a first seal of a larger diameter and a second seal of a smaller diameter, said seals being adapted to mate in snug sealing relationship respectively with said cylindrical surfaces, said oil seal further including at least one plate member relative to which said first and second seals are located, an opening in said plate member serving as an oil outlet and an oil inlet positioned away from said oil outlet with a passage extending from said inlet to said outlet, and with said member being imperforate between said first and second seals except for said oil outlet, and said seals and said plate member being adapted to maintain an oil bath in the space between said seals and said rotatable part under at least some conditions.

19. A plenum seal comprising, in combination, a plate having a first circular oil seal adjacent an outer diameter margin thereof, and an inner margin containing a second oil seal, thereby defining a space between said plate, said first and second seals, and an associated machine part, an oil outlet opening communicating with said space and means defining an oil passage extending from said oil outlet opening to a location spaced apart from said space to provide a pickup of oil upon demand therefor and to direct said oil from a location outside said space to an area inside said space.

* * * * *